United States Patent [19]
Koivisto et al.

[11] Patent Number: 6,082,203
[45] Date of Patent: Jul. 4, 2000

[54] SENSING ELEMENT FOR MEASURING LOADS

[75] Inventors: Vesa Koivisto; Jari Sundqvist, both of Lappenranta, Finland

[73] Assignee: Marja-Liisa Koivisto, Finland

[21] Appl. No.: 09/029,998

[22] PCT Filed: Sep. 16, 1996

[86] PCT No.: PCT/FI96/00488

§ 371 Date: May 15, 1998

§ 102(e) Date: May 15, 1998

[87] PCT Pub. No.: WO97/10486

PCT Pub. Date: Mar. 20, 1997

[30] Foreign Application Priority Data

Sep. 15, 1995 [FI] Finland .................................. 954345

[51] Int. Cl.[7] ........................................................ G01L 1/04
[52] U.S. Cl. ........................................................ 73/862.627
[58] Field of Search ....................... 73/862.627, 862.632, 73/862.635, 431, 866.5, 88.5

[56] References Cited

U.S. PATENT DOCUMENTS

| | | | |
|---|---|---|---|
| 3,266,303 | 8/1966 | Pfann | 73/862.632 X |
| 3,853,000 | 12/1974 | Barnett et al. | |
| 3,986,012 | 10/1976 | Loshbough et al. | 235/151.33 |
| 3,986,254 | 10/1976 | Nordstrom | |
| 4,023,402 | 5/1977 | Watanabe | |
| 4,086,576 | 4/1978 | Jebb et al. | |
| 4,375,243 | 3/1983 | Doll | 177/25 |
| 4,549,439 | 10/1985 | Keen et al. | 73/862.627 |
| 4,557,150 | 12/1985 | Utsunomiya | 73/862.627 |
| 5,002,141 | 3/1991 | Loshbough et al. | 177/210 |
| 5,183,996 | 2/1993 | Hazan et al. | 219/452 |
| 5,313,022 | 5/1994 | Piroozmandi et al. | 73/862.627 X |
| 5,442,146 | 8/1995 | Bell et al. | 177/210 FP |
| 5,522,270 | 6/1996 | Gissinger et al. | 73/862.627 |

FOREIGN PATENT DOCUMENTS

| | | |
|---|---|---|
| 2207820 | 8/1972 | Germany . |
| 2543435 | 4/1976 | Germany . |
| 2553350 | 8/1976 | Germany . |
| 2606753 | 4/1978 | Germany . |
| 2901995 | 7/1980 | Germany . |
| 1333167 | of 0000 | United Kingdom . |
| 1440857 | of 0000 | United Kingdom . |
| 1520061 | of 0000 | United Kingdom . |

OTHER PUBLICATIONS

Koivisto, Marja–Liisa; Official Action; Apr. 21, 1998.
Koivisto, Marja–Liisa; Official Action; May 14, 1996.

Primary Examiner—Benjamin R. Fuller
Assistant Examiner—Jewel Thompson
Attorney, Agent, or Firm—Banner & Witcoff, Ltd.

[57] ABSTRACT

The invention relates to a sensing element for measuring loads. According to the invention, the sensing element commprises: a strain transducer unit (1) measuring the strain in a structure, including a strain transducer element, such as a strain gauge element (6); and a protecting shell (2) inside which the strain transducer unit (1) is fitted and which protecting shell includes: a base plate (3), on top of which the strain transducer unit (1) is attached; and a protecting hood (4) which is fitted around the strain transducer unit (1), on top of the base plate (3). The protecting hood (4) is most advantageously filled with protecting material (5), such as silicon.

34 Claims, 3 Drawing Sheets

SENSING ELEMENT FOR MEASURING LOADS

The invention relates to a sensing element for measuring loads according to the introductory section of the independent patent claim.

In the prior art there is known a measuring arrangement where a sensing element, particularly a strain gauge transducer, is directly attached to the structure of the target under measurement by adhesion. A drawback in this arrangement is that the base where the sensor is attached must be well cleaned, and the adhesion must be performed with care. Otherwise there is the risk that the sensor may at some stage suddenly detach from the base. The fastening must be carried out the more carefully, the more demanding is the environment where the sensor is fitted. A particularly difficult environment is the frame structure of a vehicle when measuring the strains, particularly load strains, directed thereto. The temperature around the vehicle may vary for instance from +30° C. to −40° C. Moreover, the sensor is subject to continuous shaking while the vehicle moves. At times the sensor may also be subject to powerful impacts in the form of stones or the like flown off the road surface; such impacts the sensor does not endure but is broken.

In the prior art there is known a measuring arrangement where a sensing element, particularly a strain gauge transducer, is directly attached to the structure under measurement by adhesion, and in the vicinity of this or several sensors, at a slight distance, there is placed a measuring transmitter or the like in order to process the analog measuring signal obtained from the sensor/sensors, for instance in order to amplify the signal and convert it to a current message or a digital message, and further in order to transmit it to the data collecting and processing unit, wherefrom the strain values, such as weight strain, directed to the structures are announced.

A drawback in arranging the sensor/sensors and the measuring transmitter at a distance from each other is that within said interval, interference is summed in the measuring message, and the noise level grows.

The object of the present invention is to introduce a novel sensing element for measuring strains directed to a structure, whereby at least part of the above described drawbacks can be avoided.

The sensing element according to the invention is characterised by the novel features enlisted in the independent patent claim.

The structure of the sensing element according to the invention for measuring loads comprises: a strain transducer unit measuring structural strain, including a strain transducer element, such as a strain gauge element; and a protecting shell, inside which the strain transducer unit is arranged and which comprises: a base plate, on top of which the strain transducer unit is attached; and a protecting hood, which is fitted around the strain transducer unit, on top of the base plate.

An advantage of the invention is that the strain transducer unit is effectively protected by means of the protecting shell. Another advantage is that when the base plate and the protecting hood are made of metal sheet, advantageously steel sheet, the sensor is easily attached to a metal structure, particularly a steel beam, by welding at the base plate. Thus the fastening of the sensors to the target under measurement is carried out more rapidly, and it does not require so extensive and careful preparations as in a case where the strain gauge element alone is glued to the base. A further advantage of the invention is that the strain transducer unit fitted inside the protecting shell is easily tested in a test bench prior to the installation proper, and thus the operation of the strain transducer unit can be checked. It is yet an advantage of the invention that the sensor is replaceable on the measuring site in a fairly simple fashion in case of malfunction for one reason or another.

According to a preferred embodiment of the invention, the strain transducer unit comprises an A/D converter and a microprocessor for converting the analog measuring message to digital form and for pretreating the measuring data. Now the strain transducer unit is advantageously designed as a hybrid circuit that contains, in addition to the strain transducer unit proper, electronic circuits for processing the measuring messages. This is an effective procedure for preventing interference and in general the summing of noise in the measuring message, when transmitting said message from the sensor onwards, to the data collector and processor device proper. It is particularly advantageous to convert the measuring message in the strain transducer unit into a digital message. Digital measuring messages can be transmitted to the data collector and processor device from several different sensors by utilising a digital data transmission channel (local network) without integrating interference/noise in the measuring message. This is extremely important in demanding conditions, where temperature variations can be large and the sensors and the transmission system in general are submitted to strong mechanical strain.

The invention is explained in more detail below, with reference to the appended drawings, wherein FIG. 1 is a top-view illustration of a sensing element according to the invention;

Figure 1:
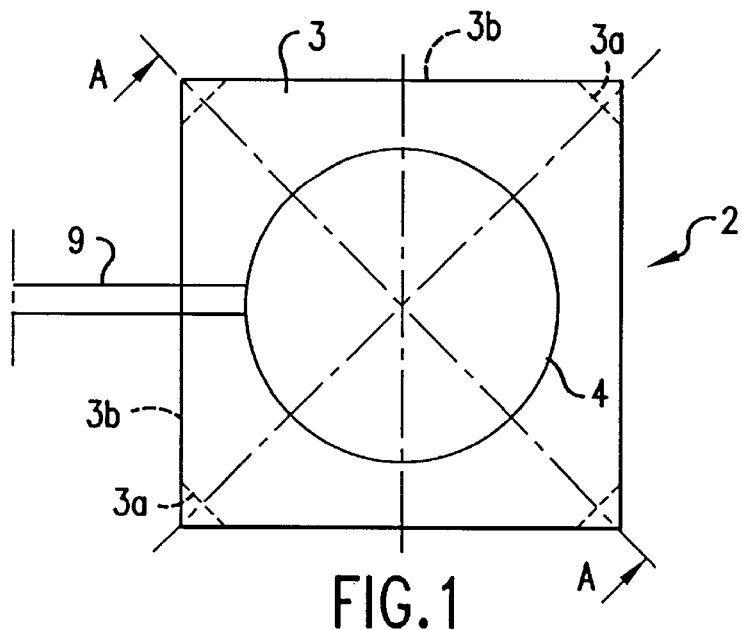
Figure 2:
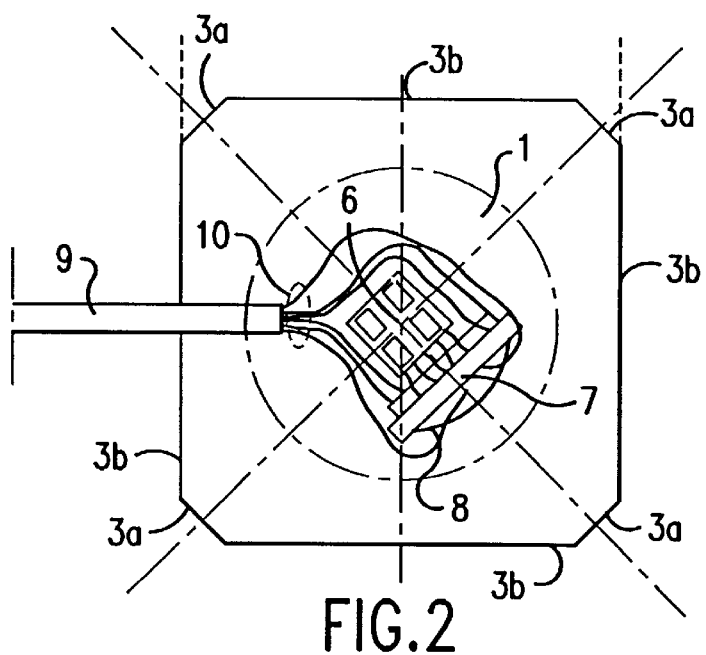
FIG. 2 is a top-view illustration of the sensing element of FIG. 1, with the protecting hood and the protecting material removed.
Figure 3:
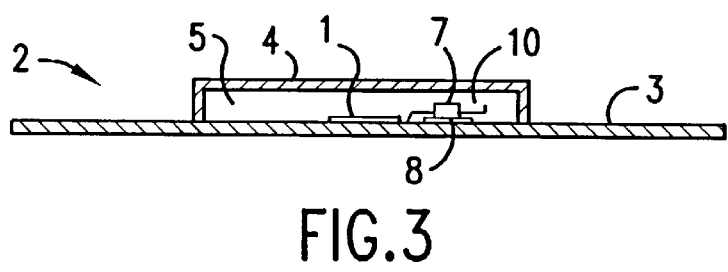
FIG. 3 is a cross-section along the line A—A of the sensing element of FIG. 1.

The sensing element according to FIGS. 1–3 for measuring loads comprises a strain transducer unit 1 and a protecting shell 2, inside which the strain transducer unit 1 is fitted. The protecting shell 2 includes a base plate 3, a protecting hood 4 and protecting material 5. The strain transducer unit 1 is attached on top of the base plate 3. The protecting hood 4 is fitted around the strain transducer unit 1, on top of the base plate 3. The protecting hood 4 is filled with the protecting material 5.

The base plate 3 and protecting hood 4 of the protecting shell 2 are made of metal sheet, advantageously steel sheet. In shape the base plate 3 represents an octagon (FIG. 2) modified of squares, so that the first opposite sides 3a are shorter than the adjacent second opposite sides 3b. The base plate 3 can also be rectangular in shape, or most advantageously a square. As shown in the figures, a preferred embodiment of the base plate has a shape such as a square or an octagon that is symmetrical about at least three axes that lie in the same plane as the base plate and that extend through the center of the base plate 3. The purpose of the octagonal shape is mainly to indicate, by means of the intersection points of the sides, i.e. the points of the polygon, the spots in the base plate where the sensing element is most advantageously fixable by welding at the measuring point of the structure, which can be a steel beam or the like. Naturally the fastening points can be shown in the base plate by means of compression marks, grooves or in some other suitable fashion. The fastening points must be chosen carefully so that the deformations in the structure under measurement are as such transmitted in the base plate 3, where the measurements are ultimately carried out. Thus the base plate 3 must fully conform to the deformations of the structure in order to obtain reliable measuring results as for the deforming strain directed to the measuring point in the structure, such as shearing forces and bending and/or twisting strain.

The strain transducer unit 1 is attached in the middle area of the base plate 3. In particular the strain transducer element, such as a strain gauge element 6, is advantageously placed in the middle of the base plate 3, as is illustrated in FIG. 2.

In the embodiment of FIGS. 1–3, the strain transducer unit 1 includes, in addition to the strain gauge element 6, a connector 7 and a circuit board 8. The strain gauge element 6 is tightly attached, for instance glued to the base plate 3. Adjacent thereto, on one side thereof, there is also glued the circuit board 8, with the connector 7 provided in connection thereto. The connecting wires of the strain gauge element 6 are connected to the wiring of the circuit board 8, wherethrough they are further coupled to the connecting poles of the connector 7. The wire 9 connects the sensors to the external world. The wire 9 is connected, via the provided conductors 10, to the poles of the connector 7 and further therethrough to the strain gauge element 6. Via the wire 9, a suitable voltage is brought to the strain gauge element 6, and respectively the measuring message obtained from the strain gauge element 6 is transmitted, via the wire 9, to an external data collector and processor device.

When the parts of the strain transducer unit 1, i.e. the strain gauge element 6, the circuit board 8 and the connector 7, are attached to the base plate 3 during the sensor manufacturing stage, the protecting hood 4 filled with a suitable protecting material 5 is fitted on top of the strain transducer unit 1 in the base plate 3. Now the protecting hood 4 is advantageously fastened to the base plate 3 by means of the protecting material 5. The employed protecting material 5 is some insulating, paste-like material generally known and used in the electronics industry, such as silicon. The protecting material is for instance baked at a suitable temperature, together with the protecting hood 4, to be attached to the base plate 3. As can be seen in the figures, the protecting hood 4 is secured to the base plate 3 so that an outer periphery of the protecting hood 4 is located within an outer edge of the base plate 3.

In the above described embodiment, the protecting hood 4 is filled with the protecting material 5. Alternatively the protecting hood 4 is not filled with protecting material, but it is allowed to be filled with air, or a suitable (protecting) gas or gas mixture is provided therein.

The strain transducer element used in the above described embodiment is most advantageously a strain gauge element 6. In this embodiment, the strain gauge element is a commercially available element component including four strain gauge elements to be coupled to a Wheatstone bridge.

Figure 4:
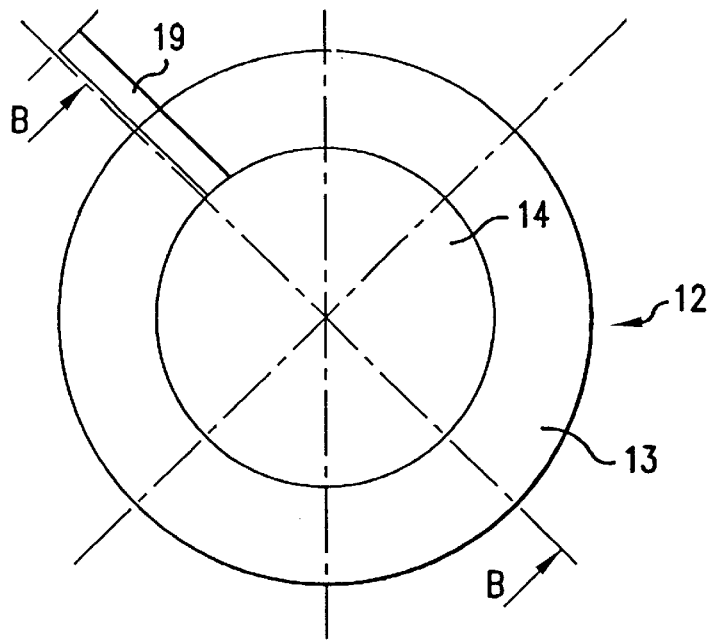
FIG. 4 is a top-view illustration of another sensing element according to the invention.
Figure 5:
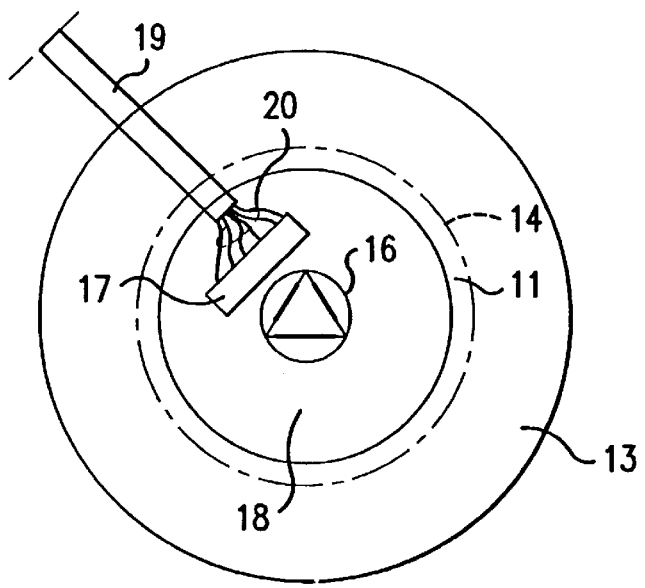
FIG. 5 is a top-view illustration of the sensing element of FIG. 4, with the protecting hood and the protecting material removed.
Figure 6:
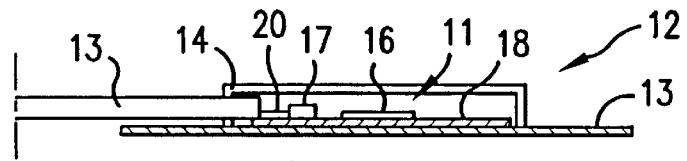
FIG. 6 illustrates the sensing element of FIG. 5 along the section B—B.

Another sensing element according to the invention is illustrated in FIGS. 4–6. Also in this case, the sensor comprises a strain transducer unit 11, which is arranged inside a protecting shell 12. The protecting shell includes a base plate 13, a protecting hood 14 and protecting material 15 (or then gas or gas mixture is provided inside the protecting hood 14). The strain transducer unit 11 comprises a strain gauge element 16, a connector 17 and a circuit board 18. The strain gauge element 16 is tightly attached, such as glued, to the circuit board 18. On the circuit board 18, there also is fitted the connector 17. Via the conductors of the circuit board, the poles of the strain gauge element 16 are connected to the connector 17. To the connector 17, in turn, there is coupled a wire 19 comprising a number of conductors 20, wherethrough the strain transducer unit 11 and particularly the strain gauge element 16 are connected to devices external to the sensors, such as an electricity source and a data collector and processor device.

In this embodiment, the base plate 13 of the protecting shell 12 is a round disc made of metal sheet, advantageously steel sheet. As shown in the figures, the round base plate 13 is symmetrical about at least three axes that extend through the center of the base plate 13. The protecting hood 14 is most advantageously made of a corresponding material as the base plate 13. In that case the sensor can be fixed at a prechosen measuring point in the structure for instance by welding the protecting shell 12 at suitable spots on the circumference of the base plate 13.

The strain transducer unit 11 is realised so that the strain gauge element 16 is fastened tightly, such as glued, onto the circuit board 18, and its conductors are fixed by soldering to the poles of the circuit board 18 reserved for this purpose. Advantageously the circuit board 18 is a round disc made of a thin plastic material and provided with wiring. The strain gauge element 16 is most advantageously arranged in the middle of the circuit board 18, which again is tightly attached, such as glued, in the middle of the base plate 13. Thus the strain gauge element 16 is located essentially in the middle area of the base plate 13.

In this embodiment, the strain gauge element 16 is realised by means of a commercially available strain gauge element, where the strain gauge elements are arranged on the sides of a isosceles triangle. A sensor provided with this kind of strain gauge element can be arranged in the measuring spot in any position whatsoever. The signal describing load obtained from the sensor is in principle independent of the position of the strain gauge element.

Figure 7:
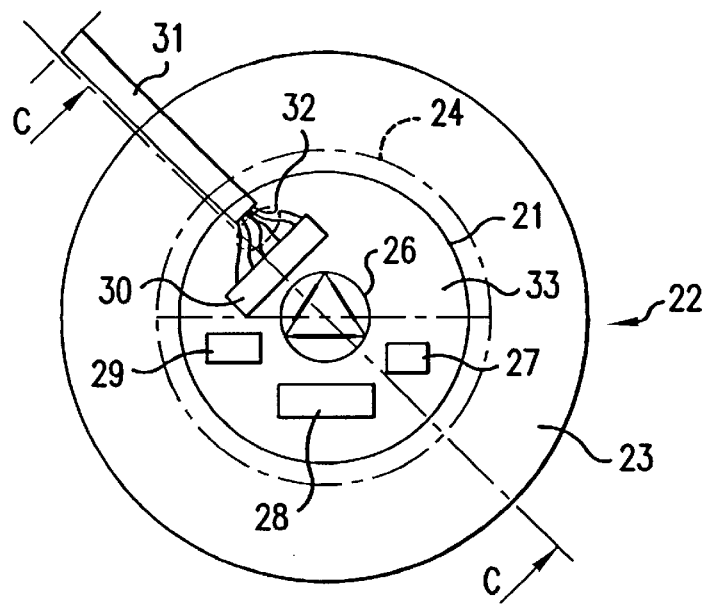
FIG. 7 is a top-view illustration of a third sensing element according to the invention, with the protecting hood and the protecting material removed.
Figure 8:
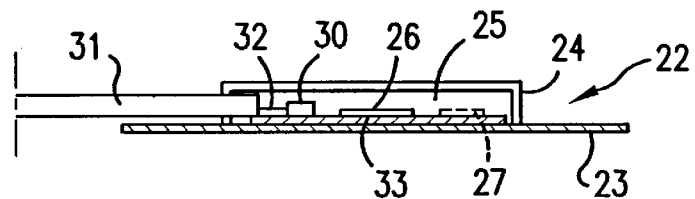
FIG. 8 illustrates the sensing element of FIG. 7 along the section C—C.

A third embodiment of the sensing element according to the invention is illustrated in FIGS. 7 and 8. Also this sensor comprises a strain transducer unit 21 measuring structural strain and a protecting shell 22, wherein the strain transducer unit 21 is arranged. As in the description above, the protecting shell 22 includes a base plate 23, a protecting hood 24 and protecting material 25 (or then the protecting hood 24 is filled with gas or gas mixture). The strain transducer unit 21 is attached to the base plate 23. The protecting hood 24, which is filled with protecting material 25 (or gas), is in turn arranged around the strain transducer unit 21, on top of the base plate 23.

The strain transducer unit 21 comprises a strain transducer element, advantageously a strain gauge element 26, and A/D converter 27, a data processing unit 28, advantageously a microprocessor, an adapter 29 and a connector 30. To the connector 30, there is coupled a wire 31 consisting of a number of conductors 32, through which the strain transducer unit 21 can be coupled to devices external to the sensor, such as an electricity source and a data collector and processor device.

The base plate 23 and the protecting hood 24 of the protecting shell 22 are made of metal sheet, advantageously steel sheet. In this embodiment, the base plate 23 is a round disc. The sensor is attachable at the base plate 23, for instance by welding on the circumference of the base plate 23 at regular intervals, to the target of measurement, such as a steel beam of the structure.

The strain transducer unit 21 comprises a circuit board 33, which is fastened tightly, advantageously glued to the middle area of the base plate 23, advantageously in the centre thereof. On the circuit board 33 in turn there is fastened tightly, advantageously glued, a strain gauge element 26. The conductors of the strain gauge element 26 are attached to the poles of the circuit board 33, wherefrom the circuit board conductors connect the strain gauge element 26 to an A/D converter 27. On the circuit board 31 there are further fitted the connected A/D converter 27, a data processing unit 28 and an adapter 29. The adapter 29 is further connected, via the conductors of the circuit board 31, to the connector 30, and via the conductors 33 of the wire 32 to devices external to the sensor.

Figure 9:
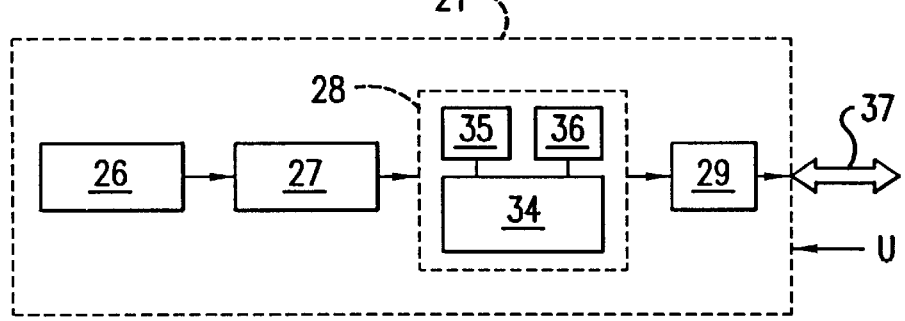
FIG. 9 illustrates a sensing element in block diagram form.

A structure of the strain transducer unit 21 is illustrated as a block diagram in FIG. 9. The reference numbers correspond to the numbers of the parts of the strain transducer unit 21 illustrated in FIGS. 7 and 8. Advantageously the data processing unit 28 comprises a microprocessor 34 and a number of memory units 35, 36. The data processing unit 28 is connected via the adapter 29 to a data transmission channel 37, which is physically formed of a number of conductors 32. In addition to this, the service voltage U also is advantageously brought via the conductors 32 to the electronic components of the strain transducer unit 21.

The sensing elements according to the invention, such as those illustrated in FIGS. 1–3, 4–6 and 7, 8 can, when necessary, be enclosed in an additional protecting shell. This is advantageously realised after the sensor itself is fastened for instance by welding to the point of measurement in the structure. The additional protecting shell is a cup-like casing made for instance of metal sheet, such as steel sheet, which casing is then fixed on top of the sensor and around it to provide additional protection mainly against mechanical impacts in demanding conditions.

The sensing element according to the invention is meant for measuring loads directed to a structure. Generally there are several sensing elements, and they are placed on different sides of the structure in order to measure weight strain or other similar loads directed to said structure. In this respect, we refer for instance to the international patent applications WO-91/19172, WO-94/23275 and to the international patent application PCT/FI 95/00133.

Figure 10:
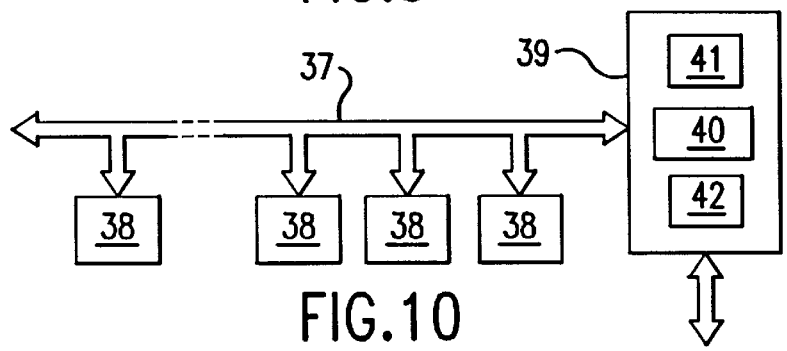
FIG. 10 illustrates the load measuring system as a block diagram, where sensing elements according to the invention are used.

When in the measuring of loads directed to structures there are used intelligent sensing elements 38 according to FIGS. 7–9, they can be interconnected on the data transmission channel 37 and further, via this channel, to a suitable data processing unit 39, as is illustrated in the block diagram of FIG. 10. The data processing unit 39 contains, among others, a microprocessor 40 with a memory unit as well as a display 41 and a keyboard 42. The data processing unit 39 is in that case used as a data collector and processor device.

In the specification above, the invention is described with reference to a few preferred embodiments, but it is obvious that the invention can be modified in many ways within the scope of the inventional idea defined in the appended patent claims.

What is claimed is:

1. A sensing element for measuring loads comprising: a strain transducer unit including a strain transducer element; a base plate on which said strain transducer unit is mounted and by which said strain transducer unit can be fixed to a measuring point of a structure such that the base plate does not move relative to the structure when a load is being measured, said base plate lies in a plane and is symmetrical about at least three axes extending within said plane and through a center of the base plate, said base plate including a middle region to which said strain transducer element is attached and an outer edge; and a protecting hood mounted over said strain transducer unit and on an upper surface of said base plate so that said protecting hood encloses said strain transducer unit and a periphery of said protecting hood is spaced inwardly toward the center of the said base plate from said outer edge of said base plate.

2. A sensing element according to claim 1 wherein said strain transducer element includes a strain gage element.

3. A sensing element according to claim 1 wherein the base plate is a square plate.

4. A sensing element according to claim 1 wherein the base plate is octagonal in shape.

5. A sensing element according to claim 1 wherein the base plate is a round disc.

6. A sensing element according to claim 1 wherein the base plate and the protecting hood include a metal sheet.

7. A sensing element according to claim 6 wherein said metal sheet is a steel sheet.

8. A sensing element according to claim 1 wherein a volume within the protecting hood contains a material for protecting said strain transducer element.

9. A sensing element according to claim 8 wherein the protecting material includes a resilient silicon material.

10. A sensing element according to claim 9 wherein the protecting hood is secured to said base plate by the resilient material.

11. A sensing element according to claim 1 wherein the strain transducer unit further includes an A/D converter and a data processing unit for converting an analog measuring message to digital form and for pretreating measuring data.

12. A sensing element according to claim 1 wherein said data processing unit includes a microprocessor.

13. A sensing element according to claim 1 wherein the strain transducer unit comprises a circuit board on which said strain transducer element is attached.

14. A sensing element according to claim 13 wherein the circuit board is a round disc made of a thin plastic material attached in the middle region of the base plate; and wherein the strain transducer element is attached in the middle of the circuit board.

15. A sensing element according to claim 14 wherein the strain transducer unit comprises a connector to which the strain transducer element is connected, and wherein said strain transducer element is capable of being connected to external devices.

16. A sensing element according to claim 14 wherein the base plate is a round disc.

17. A sensing element according to claim 13 wherein the strain transducer unit comprises strain gauge elements arranged to form an isosceles triangle.

18. A sensing element according to claim 13 wherein the strain transducer unit further includes an A/D converter and a data processing unit for converting an analog measuring message to digital form and for pretreating measuring data.

19. A sensing element for measuring loads comprising: a strain transducer unit including a strain transducer element having a strain gage element; a base plate on which the strain transducer unit is mounted and by which said strain transducer unit can be fixed to a measuring point of a structure such that the base plate does not move relative to the structure when a load is being measured, wherein the base plate lies substantially in a plane and is symmetrical about at least three axes extending within said plane and through a center of the base plate, said base plate includes a middle region to which the strain transducer element is attached; and a protecting hood mounted on top of the base plate so that it encloses the strain transducer unit.

20. A sensing element for measuring loads comprising: a strain transducer unit including a strain transducer element; a base plate on which the strain transducer unit is mounted and by which said strain transducer unit can be fixed on a measuring point of a structure such that the base plate does not move relative to the structure when a load is being measured, wherein the base plate lies substantially in a plane and is symmetrical about at least three axes extending within said plane and through a center of the base plate, and said base plate includes a middle region to which the strain transducer element is attached; a protecting hood which includes a protecting material and which is mounted on an upper surface of the base plate for enclosing the strain transducer unit, and wherein an outer edge of the base plate extends beyond an outer periphery of the protecting hood; and the base plate and the protecting hood each include a metal sheet.

21. A sensing element according to claim 20 wherein the base plate is a square plate.

22. A sensing element according to claim 20 wherein the base plate has an octagonal shape.

23. A sensing element according to claim 20 wherein the base plate is a round disk.

24. A sensing element according to claim 20 wherein the strain transducer unit comprises strain gauge elements arranged to form an isosceles triangle.

25. A sensing element according to claim 20 wherein the strain transducer unit further includes an A/D converter and a data processing unit, for converting an analog measuring message to digital form and for pretreating the measuring data.

26. A sensing element according to claim 20 wherein the strain transducer unit comprises: strain gage elements arranged to form an isosceles triangle; an A/D converter and a data processing unit for converting an analog measuring message to digital form and for pretreating measuring data; and a circuit board on which the strain gage elements, the A/D converter and the data processing unit are attached.

27. A sensing element for measuring loads comprising: a strain transducer unit including a strain transducer element and a circuit board on which a strain transducer element is tightly attached; a base plate on which the strain transducer unit is mounted and by which said strain transducer unit can be fixed on a measuring point of a structure such that the base plate does not move relative to the structure when a load is being measured, wherein the base plate lies substantially in a plane and is symmetrical about at least three axes extending within said plane and through a center of the base plate, said base plate includes a middle region to which said strain transducer element is attached; and a protecting hood which includes a protecting material and which is mounted on an upper surface of the base plate so that it encloses the strain transducer unit.

28. A sensing element according to claim 27 wherein an outer edge of the base plate extends beyond an outer periphery of the protecting hood.

29. A sensing element according to claim 28 wherein the circuit board is a round disc made of a thin plastic material; and wherein the strain transducer element is attached in the middle of said circuit board and said circuit board is attached in a center of a middle region of the base plate.

30. A sensing element according to claim 28 wherein the strain transducer unit comprises strain gauge elements arranged to form an isosceles triangle.

31. A sensing element according to claim 28 wherein the strain transducer unit further includes an A/D converter and a data processing unit for converting an analog measuring message to digital form and for pretreating measuring data.

32. A sensing element according to claim 27 wherein the base plate is a square plate.

33. A sensing element according to claim 27 wherein said base plate has an octagonal shape.

34. A sensing element according to claim 27 wherein the base plate is a round disk.

* * * * *